(12) United States Patent
Theilen

(10) Patent No.: US 9,677,242 B2
(45) Date of Patent: Jun. 13, 2017

(54) METHOD AND APPARATUS FOR ANCHORING AN IRRIGATION DRIVE ASSEMBLY

(71) Applicant: Valmont Industries, Inc., Omaha, NE (US)

(72) Inventor: Dennis Theilen, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 15/164,333

(22) Filed: May 25, 2016

(65) Prior Publication Data

US 2016/0348331 A1    Dec. 1, 2016

Related U.S. Application Data

(60) Provisional application No. 62/166,458, filed on May 26, 2015.

(51) Int. Cl.
| | |
|---|---|
| *A01G 25/09* | (2006.01) |
| *E02D 5/80* | (2006.01) |
| *E02D 5/74* | (2006.01) |
| *E02D 27/50* | (2006.01) |

(52) U.S. Cl.
CPC ............ *E02D 5/80* (2013.01); *A01G 25/092* (2013.01); *A01G 25/09* (2013.01); *E02D 5/74* (2013.01); *E02D 27/50* (2013.01)

(58) Field of Classification Search
CPC ........ A01G 25/09; A01G 25/092; E02D 5/74; E02D 5/80; E02D 27/50

USPC .... 248/346.03, 80, 518, 519, 507, 674, 675, 248/676, 677, 678, 680; 405/244, 256; 239/722, 723; 52/155; 188/7

See application file for complete search history.

(56) References Cited

U.S. PATENT DOCUMENTS

| | | | | |
|---|---|---|---|---|
| 4,209,035 A | * | 6/1980 | Hait | A01G 25/092 |
| | | | | 239/728 |
| 4,877,189 A | * | 10/1989 | Williams | A01G 25/097 |
| | | | | 239/740 |
| 6,431,475 B1 | * | 8/2002 | Williams | A01G 25/09 |
| | | | | 239/740 |
| 7,438,243 B1 | * | 10/2008 | Erickson | A01G 25/092 |
| | | | | 239/723 |
| 8,849,467 B2 | * | 9/2014 | Korus | A01G 25/092 |
| | | | | 239/722 |
| 8,998,162 B1 | * | 4/2015 | Gutha | A01G 25/09 |
| | | | | 239/735 |
| 9,326,461 B2 | * | 5/2016 | Wolgast | A01G 25/092 |
| 2015/0121770 A1 | * | 5/2015 | Korus | E02D 5/80 |
| | | | | 52/1 |

* cited by examiner

*Primary Examiner* — Tan Le
(74) *Attorney, Agent, or Firm* — Milligan PC LLO

(57) ABSTRACT

The present invention provides a system and method for anchoring an irrigation system. According to a first preferred embodiment, the present invention includes a preinstalled concrete stage on which a drive tower may be positioned. Preferably, the concrete stage further includes a securing shelf mechanism for providing a restraint over the rear tire. As further disclosed, the present invention preferably further includes a barricade secured in front of the front tire of the drive tower to prevent the drive tower from sliding out of position.

4 Claims, 4 Drawing Sheets

METHOD AND APPARATUS FOR ANCHORING AN IRRIGATION DRIVE ASSEMBLY

RELATED APPLICATIONS

The present application claims priority to U.S. Provisional Application No. 62/166,458 filed May 26, 2015.

FIELD OF INVENTION

The present invention is related in general to the field of irrigation and, in particular, to a method and apparatus for anchoring an irrigation drive assembly.

BACKGROUND OF THE INVENTION

In the field of self-propelled irrigation, pivoting extensions are commonly used in order to "bend" or turn a portion of the irrigation assembly at an angle in order to irrigate more acres than can be irrigated with a standard pivot. Such an irrigation system couples a main section assembly to an extension section assembly. The irrigation system is configured to allow the extension section assembly to pivot about the main section assembly to irrigate areas otherwise unavailable due to obstructions.

In bending pivot irrigation systems, significant angular forces are often applied to drive units and, in particular, to stopped (bending) drive units due to the pulling forces from the drive units outside of the stopped drive unit. Often, the forces applied to the drive units by the extension section assembly can cause the stopped drive unit(s) to be pulled over. Other forces such as gusting winds or uneven ground can also create or add to the hazard of turning over a drive unit.

To solve this problem, the prior art includes techniques such as manually tying a chain or brace to a drive unit in order to prevent the drive unit from being pulled over. These techniques require significant time to deploy and they are often too slow to use against rapidly developing wind gusts and storms. Further, they do not provide a sufficient counter balance for the drive units. An example anchoring technique is shown in U.S. Pub No. 2015/121770 to Korus.

Based on the foregoing, there is a need for an alternative to the current anchoring systems known in the prior art. The present invention overcomes prior art shortcomings by accomplishing this critical objective.

SUMMARY OF THE DISCLOSURE

To minimize the limitations found in the prior art, and to minimize other limitations that will be apparent upon the reading of the specification, the preferred embodiment of the present invention provides a system and method for anchoring an irrigation assembly. According to a first preferred embodiment, the present invention includes a preinstalled concrete stage on which a drive tower may be positioned. Preferably, the concrete stage includes a securing shelf mechanism for providing a restraint over the rear tire (i.e., the tire that is being lifted by the pull forces of the extension section assembly). As further disclosed, the present invention may preferably further include a barricade secured in front of the front tire of the drive tower to prevent the drive tower from sliding out of position.

According to further preferred aspects of the present invention, the present invention may preferably include a hook and post system to further prevent the lifting or compression of the tires of a drive tower. According to a preferred embodiment, the hook is preferably provided on a rear side of the drive tower to act as a primary restraint in addition to the restraint from the secondary shelf restraint of the first embodiment.

According to further aspects, the present invention may also be used to secure and support drive units of an irrigation system in a variety of different locations and circumstances.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1:
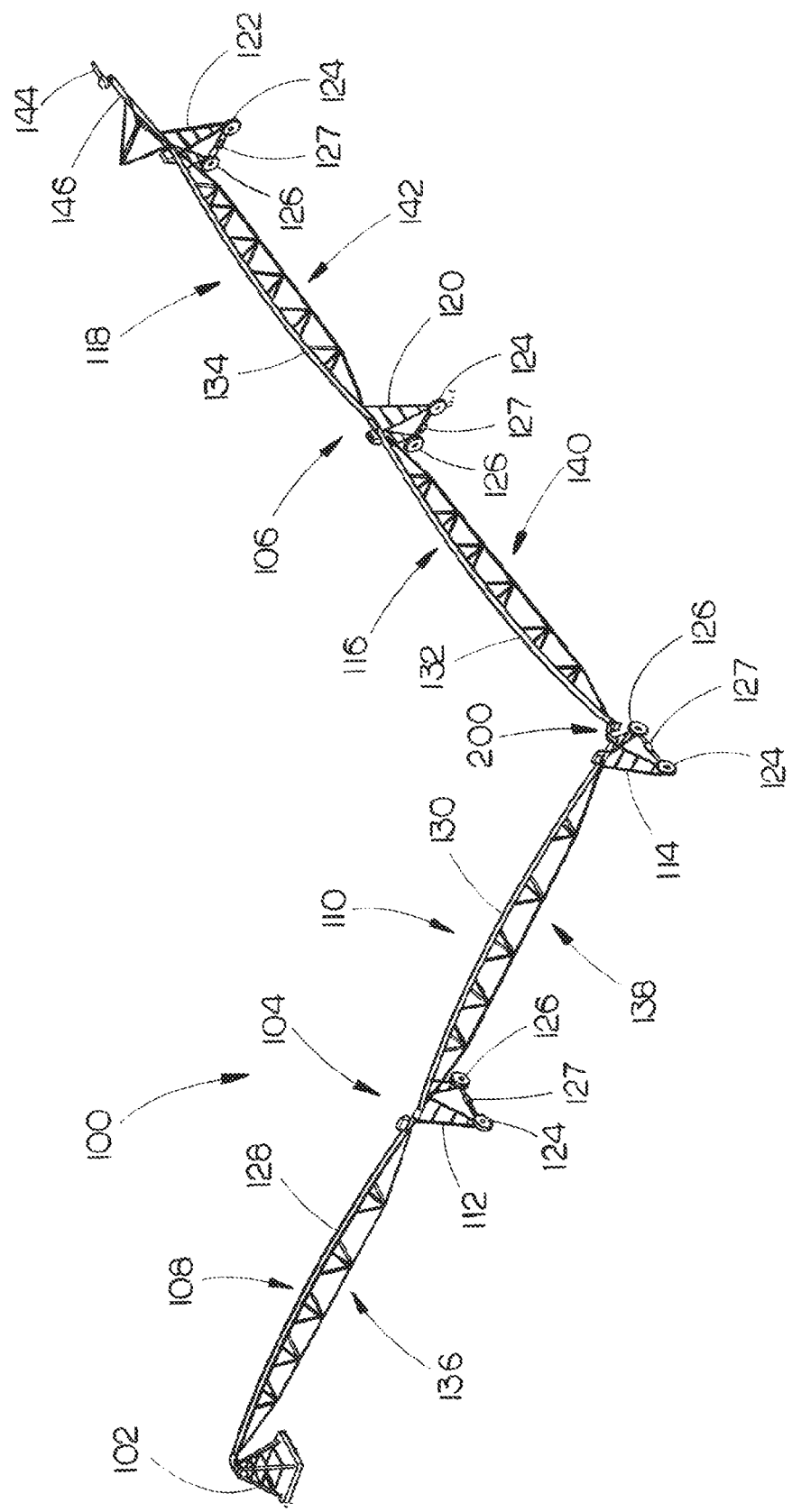
FIG. 1 is a perspective view of an exemplary irrigation system.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Throughout the present disclosure, it will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

The anchor system of the present invention is primarily designed for use with a mechanized or mobile irrigation system such as a center pivot or linear irrigation system. However, the system may also work on a variety of different systems and structures without limitation.

FIGS. 1 through 4 illustrate an articulating irrigation system 100, such as a self-propelled irrigation system, in accordance with example implementations of the present disclosure. As shown, the system 100 includes a center pivot structure 102, a main section assembly 104 (main irrigation section assembly) coupled (e.g., connected) to the center pivot structure 102, and an extension section assembly (extension irrigation section assembly) coupled to the main section assembly 104. Preferably, the center pivot structure 102 has access to a well, a water repository (e.g., water tank), or other source of fluids, to furnish water to the irrigation system 100. For instance, the well may be located under the center pivot structure 102. In another instance, the well may be in close proximity to the cultivation area (e.g., field). The source of fluids may be coupled to a repository or other source of agricultural products to inject fertilizers, pesticides, and/or other chemicals into the fluids to create an applicant for application during irrigation. In an implementation, the center pivot structure 102 may comprise a frame assembly (e.g., galvanized steel frame assembly, and so forth).

The main section assembly 104 includes a number of interconnected spans 108, 110 supported by a tower structure and an end tower structure 114. The extension section assembly 106 also includes a number of interconnected spans 116, 118 supported by a tower structure 120 and an end tower structure 122. It is understood that the main section assembly and the extension section assembly 106 may include any number of spans and tower structures.

Figure 4:
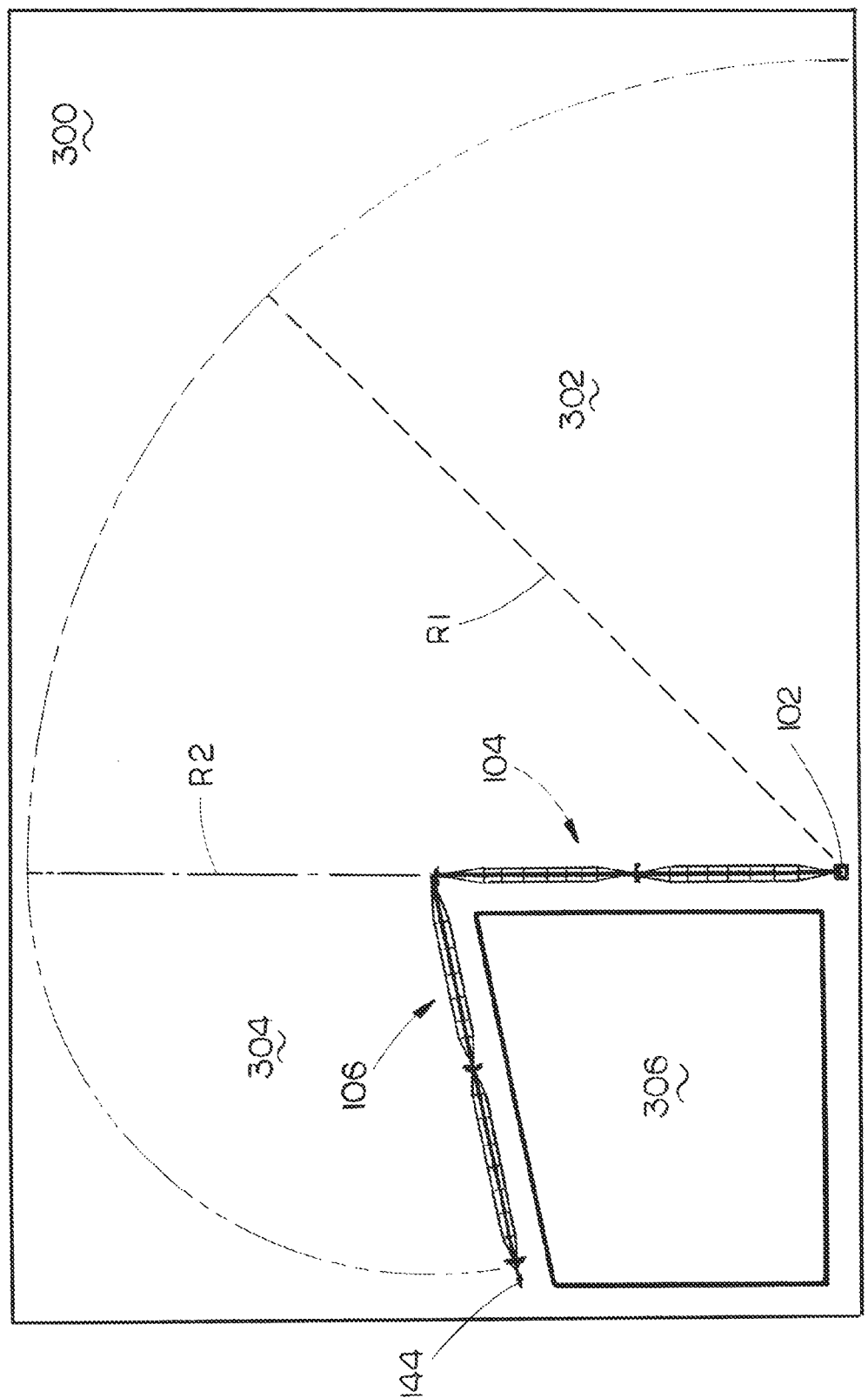
FIG. 4 is a top plan view of an environment, wherein the irrigation system shown in FIG. 1 is traversing a cultivation area.

Each tower structure 112, 114, 120, 122 includes wheels 124, 126 to assist in traversing (e.g., pivoting) the articulating irrigation system 100 about a specified area (see field 300 shown in FIG. 4). In an implementation, at least one of the wheels 124, 126 may be driven by a suitable drive unit (e.g., drive motor), or the like, to assist in traversing the system 100 about the specified area. In an implementation, each drive unit 127 may be controlled by a stop system so that the drive unit 127 can be slowed or completely shut down in the event of the detection of an adverse circumstance. In another implementation, the irrigation system 100 may also include a stop box that powers off all drive units 127 driving the main section assembly 104. In this implementation, the drive units 127 driving the extension section assembly 106 would drive the extension section assembly 106 at an increased rate as compared to the main section assembly 104.

As shown in FIG. 1, each span 108, 110, 116, 118 includes conduits 128, 130, 132, 134 (e.g., pipes) that are configured to carry (e.g., transport, provide, and so forth) liquid (e.g., applicant) along the length of the system 100 to numerous applicant dispersion devices (e.g., water emitting devices, sprinklers, and so forth) to irrigate the desired area. The applicant dispersion devices may be disposed along the conduits 128, 130, 132, 134 to furnish applicant to the cultivation areas. Each conduit 128, 130, 132, 134 may be coupled to one another to allow fluid communication between each conduit. In an implementation, the conduits 128, 130, 132, 134 may be supported by truss-type frameworks 136, 138, 140, 142 (framework structures).

As further shown in FIG. 1, the extension section assembly 106 includes an end gun 144 mounted to the end tower structure 122. For example, the end gun 144 may be mounted to the end tower structure 122 via a suitable support structure 146, such as a boom structure, or the like. In an implementation, the end gun 144 is a suitable pressure sprayer configured to be activated at the corners of a field or other designated areas to increase the amount of land that can be irrigated.

Figure 2:
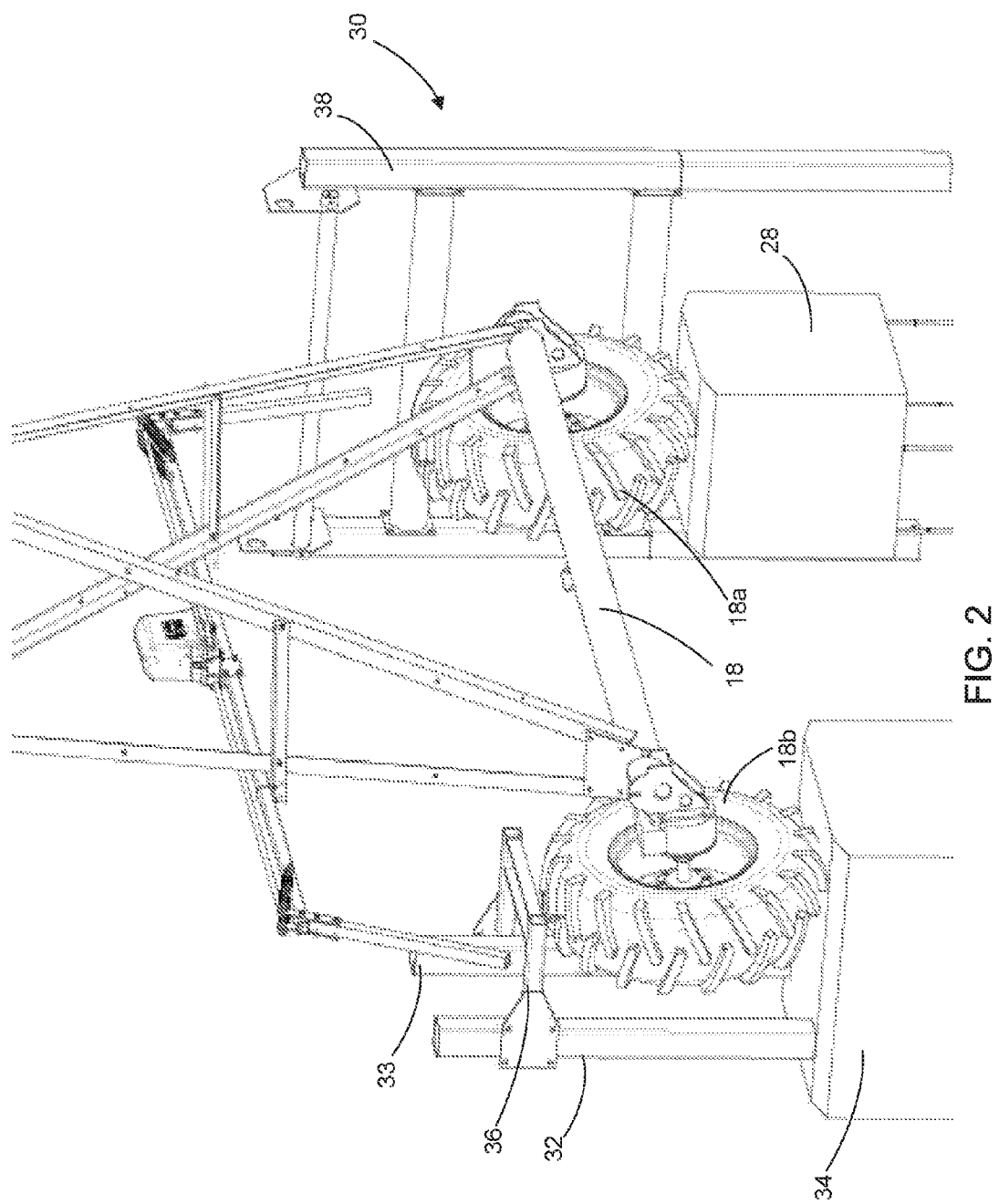
FIG. 2 is a side view of an anchoring system of the present invention in accordance with a preferred embodiment of the present invention.

With reference now to FIG. 2, an exemplary anchoring system for securing and anchoring a drive unit 18 in accordance with a first preferred embodiment of the present invention will now be discussed. In the exemplary system shown in FIG. 2, an anchoring system 30 is provided which includes a front concrete pad 28 and a rear concrete pad 34. Though the concrete pads 28, 34 are referred to as front and rear pads, it should be understood that either pad may be used to support either wheel (124 and 126 in FIG. 1) of a drive unit (127 in FIG. 1).

As shown, the front concrete pad 28 is configured and constructed to provide support to the front wheel 18a of the drive tower 18. As further shown, the rear concrete pad 34 is configured and constructed to provide support to the rear wheel 18b of the drive tower 18. As further shown, a horizontal shelf 36 is provided and positioned above the rear concrete pad 34 so that it is positioned above the rear wheel 18b when the rear wheel 18b is positioned on the rear concrete pad 34. According to a preferred embodiment, the horizontal shelf 36 is preferably secured and positioned using vertical posts 32 and 33 which are attached to the rear concrete pad. According to a preferred embodiment, the vertical posts 32, 33 may be embedded in the concrete pad 34. Alternatively, the vertical posts 32, 33 may be bolted or fastened to the concrete pad 34 by any conventional method.

As further shown in FIG. 2, the exemplary embodiment may preferably further include a barricade 38 or similar stopping mechanism to help position the drive unit 18.

According to a preferred method of operation, the concrete pads 28, 34 (including posts 32, 33 and the horizontal shelf 36) may preferably be pre-installed in a given field to be irrigated. Thereafter, an operator may preferably drive the drive unit 18 onto the concrete pads 28, 34 so that the rear tire 18b is positioned under the horizontal shelf 36. To assist the operator in positioning the drive unit 18, the barricade 38 preferably acts as a fixed stopping point to stop the drive unit 18 in the correct location.

Once properly positioned, the front barricade 38 preferably continues to act as a restraint to any force pulling the drive unit 18 forward. Further, once properly positioned, the horizontal shelf 36 preferably provides a restraint from the rear wheel 18b lifting when angular force is applied to the drive unit 18. In this way, when the rear tire 18b starts to lift from the pull of other irrigation system components (i.e. the pull of outer drive units 20 as they continue to pivot), the horizontal shelf 36 will prevent the drive unit 18 from tipping over.

In an alternative embodiment, the front barricade 38 is not utilized. The drive unit tires of a linear or center pivot irrigation system are positioned onto the concrete pads 28, 34 and under the horizontal shelf 36. When restraint against any force pulling the drive unit is no longer desired, the drive unit tires may continue in the same direction they were traveling prior to stopping (i.e., through the position occupied by the front barricade 38 in the previously described embodiment).

In a further or alternative embodiment, the restraining system of the present invention may be positioned in multiple locations for more than one drive unit of a linear or center pivot irrigation system. In a further embodiment, the restraining system of the present invention may be position in multiple locations for all of the drive units of a linear or center pivot irrigation system. In these further embodiments, the front barricade 38 is not utilized. In this embodiment, the wheels of all or more than one drive unit(s) of a linear or center pivot irrigation system may be positioned into multiple instances of the restraining system of the present invention during or prior to a storm or high wind event. In this manner, the wheels of the drive units of the irrigation system would be restrained against the pulling forces of the wind or storm event.

Figure 3:
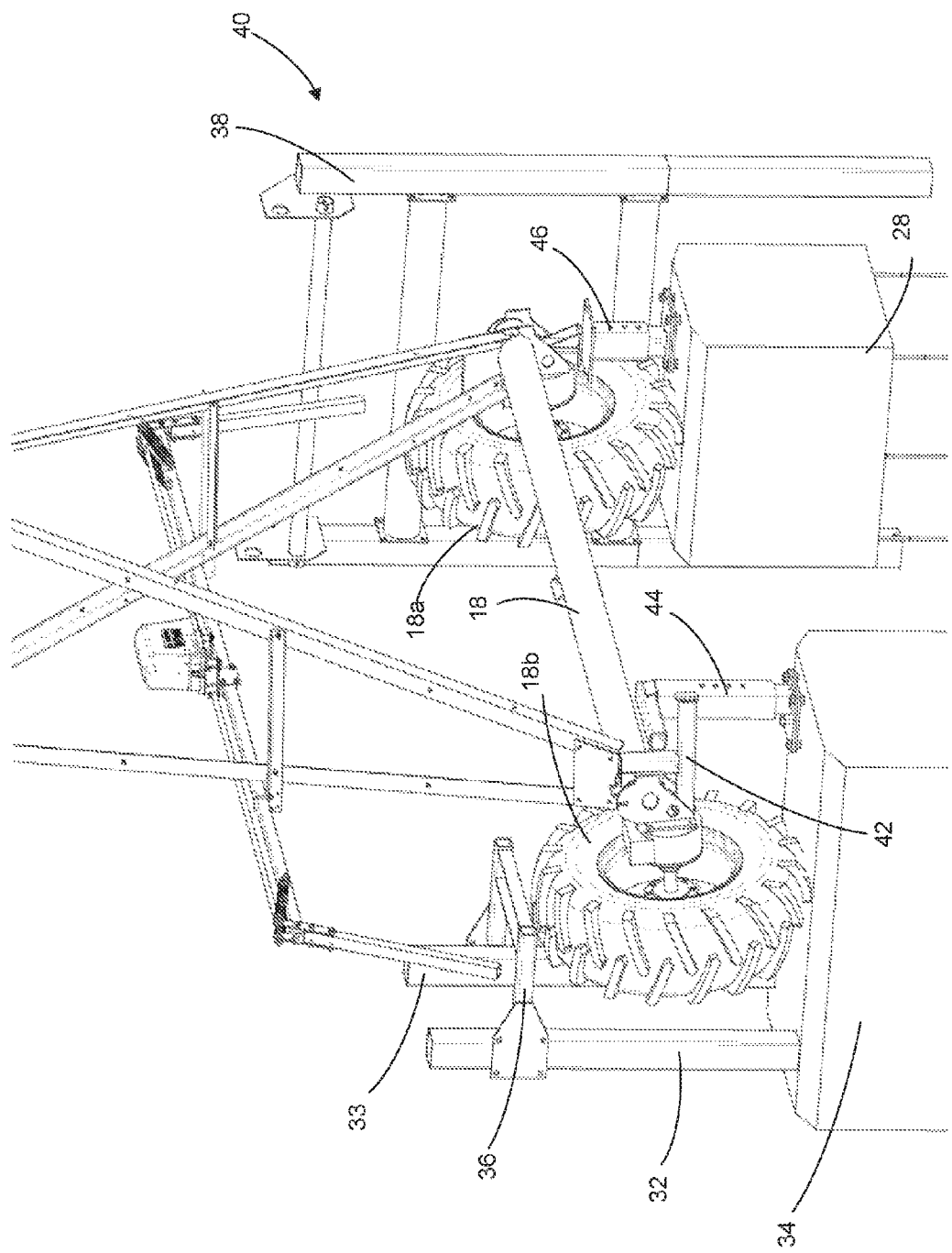
FIG. 3 is a side perspective view of an alternative preferred embodiment of the present invention.

With reference now to FIG. 3, an alternative preferred embodiment of the present invention will now be discussed. As shown in FIG. 3, the drive unit 18 is shown as explained above with respect to FIG. 2. Specifically, the drive unit 18 is positioned with a front drive wheel 18a secured on a front concrete pad 38 and rear drive wheel 18b secured on a rear concrete pad 34. As further shown, a barricade 38 is positioned in front of the front wheel 18a and a horizontal shelf 36 is positioned above the rear wheel 18b and secured by posts 32 and 33.

In addition to these features, the alternative preferred embodiment of FIG. 3 further includes a hook 42 secured by a post 44 which is positioned so that the hook 42 restrains the rear wheel from lifting up when angular force is applied to the upper portion of the drive unit 18. Preferably, the hook 42 may act as a primary restraint in addition to the restraint from the secondary shelf restraint in addition to the restraint from the secondary shelf restraint 36. As further shown, a front post 46 is preferably further provided to restrain the front wheel from being compressed or overloaded when angular force is applied to the upper portion of the drive unit 18.

FIG. 4 illustrates an example cultivation area 300 (e.g., field) to be at least partially irrigated by the irrigation system 100. As shown, field 300 includes subsections 302, 304, 306. Field subsection 302 and field subsection 304 represent an area available for cultivation, while subsection 306 represents an obstructed or an unavailable area. For example, subsection 306 may represent a building, a wetland, natural obstructions, or the like, that prevents movement of the entire irrigation system 100 over this area. Thus, the main section assembly 104 may traverse an area up (e.g., near) to the subsection 306. The extension section assembly 106 is configured to pivot about the main section assembly 104 by way of the irrigation alignment apparatus 200 to irrigate areas (e.g., field subsection 304) near subsection 306.

As shown, the applicant radii (R1, R2) differ based upon the subsection 306. For example, the irrigation system 100 is configured to furnish applicant to crops within a first radius R1 (e.g., at least approximately equal to the length of the main section assembly 104 and the extension section assembly 106) of the subsection 302 up until about the subsection 306, and then the irrigation system 100 is configured to furnish applicant to crops within a second radius R2 (e.g., at least approximately equal to the length of the extension section assembly 106) of the subsection 304. It is contemplated that when the irrigation system 100 nears subsection 306, the dispersion devices along the main section assembly 104 may be deactivated while the extension section assembly 106 continues along the path defined by radius R2.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An anchoring system for a drive unit of an irrigation system having a first drive wheel and a second drive wheel, wherein the system comprises:

a first supporting pad; wherein the first supporting pad is configured and sized to support the first drive wheel; further wherein the first supporting pad is comprised of a front surface, a back surface, a top surface and a bottom surface;

a second supporting pad; wherein the second supporting pad is configured and sized to support the second drive wheel; wherein the second supporting pad is comprised of a front surface, a back surface, a top surface and a bottom surface;

a barricade element, wherein the barricade element is comprised of a plurality of vertical barricade elements secured to the first supporting pad and extending vertically to a point above the first supporting pad; further wherein the barricade element is further comprised of a horizontal barricade element; wherein the horizontal barricade element extends horizontally between at least two vertical barricade elements; wherein the horizontal surface is substantially parallel to the front surface of the first supporting pad; further wherein the barricade element is configured to stop the horizontal motion of the first drive wheel;

a lift restraining shelf, wherein the lift restraining shelf is comprised of a plurality of vertical securing posts secured to the second supporting pad and extending vertically to a point above the height of the second drive wheel; further wherein the lift restraining shelf further comprises a horizontal restraining element;

wherein the horizontal restraining element is further comprised of at least a first extending element and a second extending element; wherein the first extending element is secured to a first vertical securing post; wherein the second extending element is secured to a second vertical securing post; further wherein the first and second extending elements are aligned perpendicular to the first and second vertical security posts; further wherein the horizontal restraining element further comprises a horizontal shelf surface; wherein the horizontal shelf surface extends between the first and second extending elements; further wherein horizontal shelf surface is configured to restrict the vertical motion of the second drive wheel;

a first opposing restraint element, wherein the first opposing restraint element is comprised of a first supporting vertical element extending vertically from the top surface of the first supporting pad and a first restraining hook; wherein the first restraining hook is configured to attached to the drive unit and to restrict the horizontal movement of a drive wheel; and a second opposing restraint element, wherein the second opposing restraint element is comprised of a second supporting vertical element extending vertically from the top surface of the second supporting pad; wherein the second opposing restraint element further comprises a lateral arm; wherein the lateral arm extends from the second supporting vertical element towards the horizontal restraining element; further wherein the lateral arm is configured to restrict the horizontal and lateral movement of a drive wheel.

2. The system of claim 1, wherein the irrigation system is a center pivot irrigation system.

3. The system of claim 2, wherein the irrigation system comprises a center pivot structure coupled to a main irrigation section assembly.

4. The system of claim 3, wherein the irrigation system further comprises an extension irrigation section assembly coupled to the main irrigation section assembly.

\* \* \* \* \*